(12) United States Patent
Cohen (10) Patent No.: US 11,676,050 B2
(45) Date of Patent: Jun. 13, 2023

(54) SYSTEMS AND METHODS FOR NEIGHBOR FREQUENCY AGGREGATION OF PARAMETRIC PROBABILITY DISTRIBUTIONS WITH DECISION TREES USING LEAF NODES

(71) Applicant: MUG LIFE, LLC, Austin, TX (US)

(72) Inventor: Robert Cohen, Austin, TX (US)

(73) Assignee: MUG LIFE, LLC, Austin, TX (US)

( * ) Notice: Subject to any disclaimer, the term of this patent is extended or adjusted under 35 U.S.C. 154(b) by 255 days.

(21) Appl. No.: 16/893,744

(22) Filed: Jun. 5, 2020

(65) Prior Publication Data

US 2020/0387811 A1     Dec. 10, 2020

Related U.S. Application Data

(60) Provisional application No. 62/857,333, filed on Jun. 5, 2019.

(51) Int. Cl.
*G06N 5/00* (2023.01)
*G06N 5/04* (2023.01)
*G06N 20/20* (2019.01)
*G06N 5/01* (2023.01)

(52) U.S. Cl.
CPC ............... *G06N 5/04* (2013.01); *G06N 5/01* (2023.01); *G06N 20/20* (2019.01)

(58) Field of Classification Search
CPC .......... G06N 5/04; G06N 20/20; G06N 5/003
See application file for complete search history.

(56) References Cited

U.S. PATENT DOCUMENTS

| 7,272,612 | B2* | 9/2007 | Birdwell | G16B 40/30 |
| 2009/0281981 | A1* | 11/2009 | Chen | G06N 20/20 |
| | | | | 706/56 |
| 2013/0282627 | A1 | 10/2013 | Faddoul et al. | |
| 2014/0089908 | A1* | 3/2014 | Dunn | G06F 8/443 |
| | | | | 717/151 |
| 2017/0228224 | A1 | 8/2017 | Dunn et al. | |
| 2018/0240041 | A1 | 8/2018 | Koch et al. | |

OTHER PUBLICATIONS

International Search Report and Written Opinion of the International Searching Authority, International Application No. PCT/US2020/036293, dated Aug. 18, 2020.

* cited by examiner

*Primary Examiner* — Pakee Fang
(74) *Attorney, Agent, or Firm* — Jackson Walker L.L.P.

(57) ABSTRACT

A method, system, and computer-usable medium are disclosed for, comprising: examining pairs of samples in each leaf node of a plurality of decision trees and for each pair of samples, determining a neighbor frequency of each pair of samples as a frequency of how often such pair of samples are filtered into a particular leaf node of the plurality of decision trees and for each leaf node of the plurality of decision trees, determining a neighbor frequency of the leaf node as an average of the neighbor frequencies of the samples of the leaf node.

24 Claims, 4 Drawing Sheets

SYSTEMS AND METHODS FOR NEIGHBOR FREQUENCY AGGREGATION OF PARAMETRIC PROBABILITY DISTRIBUTIONS WITH DECISION TREES USING LEAF NODES

RELATED APPLICATIONS

This application claims priority to each of U.S. Provisional Patent Application Ser. No. 62/857,333 filed on Jun. 5, 2019, which is incorporated by reference herein in its entirety.

FIELD OF DISCLOSURE

The present invention relates in general to the field of computers and similar technologies, and in particular to software utilized in this field. Still more particularly, it relates to systems and methods for neighbor frequency aggregation of parametric probability distributions with decision trees.

BACKGROUND

Many applications require the processing of "big data," which may be at rest or in motion. "Big data" is a broad term for data sets so large or complex that traditional data processing applications are inadequate. Challenges include analysis, capture, data curation, search, sharing, storage, transfer, visualization, and information privacy. When the data is in motion, processing it may need to take place in real time. One mechanism for processing data is through the use of decision trees. Generally speaking, a decision tree is a graph used to model decisions and their possible consequences.

When a decision tree is used, data can be classified by stepping through the nodes of the tree based on known attributes of the data. At each node, a child node is selected based on the value of an attribute of the data, and this selection process may continue until a leaf of the tree is selected. The leaf may be associated with a value to be assigned as a classification value for the data.

Decision tree learning is a form of classification learning, used to determine how to classify data. In decision tree learning, a system generates a decision tree that will be used to classify data based on observed attributes. Through the generation of the decision tree, which is an iterative generation, each interior node is split into subsets, with a child node at the root of each subset, based on the value of an attribute associated with that interior node. Each edge leading from the interior node to a child node corresponds to a particular value of the attribute. If no more attributes are available or some other stopping criteria is met, a node then becomes a leaf node in the final decision tree, corresponding to a classification or prediction of a final value for the data.

Decision trees may have many practical applications, as they can be used to model workflows, algorithms, and other automated or semi-automated behavior. Machine learning applications using decisions trees may be used in medical diagnosis and treatment, automated vehicles, automation of virtual communication (such as with "chat bots"), economic analysis, and other practical uses.

Thompson sampling is a known algorithm for efficiently maximizing a reward by selecting actions with unknown payoffs. This is known as a "multi-armed bandit" problem. When using Thompson sampling, it may be important to accurately compute probability distributions from prior samples, known as posterior probability densities. These probability distributions are well understood for independent and identically distributed (IID) samples. Given a set of known parameters (known as "context" or "features") describing each sample, computing probability distributions for a given context is much more difficult, and is an active area of research. This is known as a "contextual bandits" problem.

SUMMARY

In accordance with the teachings of the present disclosure, certain disadvantages and problems associated with existing approaches to computing probability distributions as applied to machine learning may be reduced or eliminated.

In accordance with embodiments of the present disclosure, a computer-implementable method may comprise examining pairs of samples in each leaf node of a plurality of decision trees and for each pair of samples, determining a neighbor frequency of each pair of samples as a frequency of how often such pair of samples are filtered into a particular leaf node of the plurality of decision trees and for each leaf node of the plurality of decision trees, determining a neighbor frequency of the leaf node as an average of the neighbor frequencies of the samples of the leaf node.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor and configured for: examining pairs of samples in each leaf node of a plurality of decision trees and for each pair of samples, determining a neighbor frequency of each pair of samples as a frequency of how often such pair of samples are filtered into a particular leaf node of the plurality of decision trees and for each leaf node of the plurality of decision trees, determining a neighbor frequency of the leaf node as an average of the neighbor frequencies of the samples of the leaf node.

In accordance with these and other embodiments of the present disclosure, a non-transitory, computer-readable storage medium may be provided, the non-transitory, computer-readable storage medium embodying computer program code, the computer program code comprising computer executable instructions configured for: examining pairs of samples in each leaf node of a plurality of decision trees and for each pair of samples, determining a neighbor frequency of each pair of samples as a frequency of how often such pair of samples are filtered into a particular leaf node of the plurality of decision trees and for each leaf node of the plurality of decision trees, determining a neighbor frequency of the leaf node as an average of the neighbor frequencies of the samples of the leaf node.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregation of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, a video display, and/or an interactive touchscreen. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
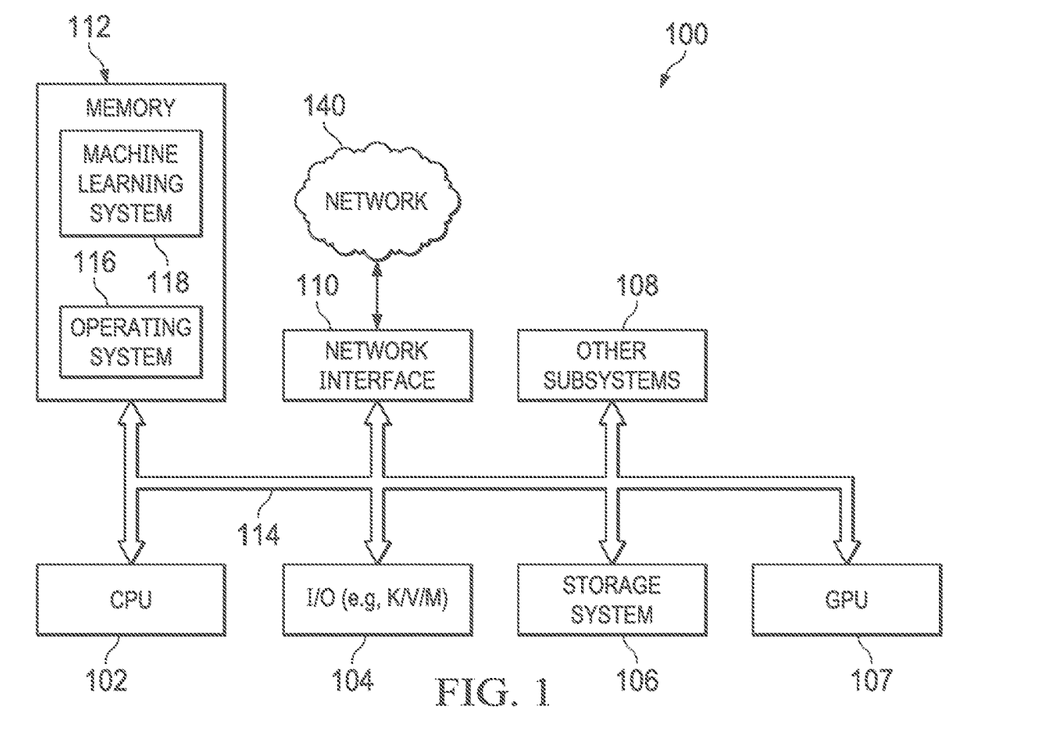
FIG. 1 illustrates a block diagram of an example information handling system in which the methods and systems disclosed herein may be implemented, in accordance with embodiments of the present disclosure.

FIG. 1 illustrates a block diagram of an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, an interactive touch screen, a camera, and/or associated controllers), a storage system 106, a graphics processing unit ("GPU") 107, and various other subsystems 108. GPU 107 may include any system, device, or apparatus configured to rapidly manipulate and alter memory to accelerate the creation of images in a frame buffer intended for output to a display. Although FIG. 1 depicts GPU 107 separate from and communicatively coupled to CPU 102, in some embodiments GPU 107 may be an integral part of CPU 102.

In various embodiments, information handling system 100 may also include network interface 110 operable to couple, via wired and/or wireless communication, to a network 140 (e.g., the Internet or other network of information handling systems). Information handling system 100 may also include system memory 112, which may be coupled to the foregoing via one or more buses 114. System memory 112 may store operating system (OS) 116 and in various embodiments may also include an machine learning system 118. In some embodiments, information handling system 100 may be able to download machine learning system 118 from network 140. For example, in embodiments in which information handling system 100 comprises a mobile device (e.g., tablet or smart phone), a user may interact with information handling system 100 to instruct information handling system 100 to download machine learning system 118 from an application "store" and install machine learning system 118 as an executable software application in system memory 112. In these and other embodiments, machine learning system 118 may be provided as a service (e.g., software as a service) from a service provider within network 140.

In accordance with embodiments of this disclosure, machine learning system 118 may be configured to calculate a new and novel neighbor frequency estimate for an plurality of decision trees (referred to herein as an "ensemble" of decision trees), and a corresponding aggregation of parametric probability distributions across such ensembles of decision trees. Accordingly, machine learning system 118 may be enabled to more accurately estimate probability distributions, thereby resulting in substantially improved performance when using parametric probability distributions and Thompson sampling to solve contextual bandits problems described in the Background section above.

Although other approaches exist for estimating probability distributions for contextual bandit problems, aggregation of ensembles of decision trees may have valuable benefits in certain applications. The new and novel approach described herein for computing parametric probability distributions with ensemble aggregation may inherit the benefits of existing approaches, while potentially improving accuracy and performance compared to existing ensemble aggregation approaches. With the addition of neighbor frequency aggregation as described herein, the use of parametric probability density functions may often outperform existing non-parametric methods, particularly for sparse data and limited computational cost.

As will be appreciated, once information handling system 100 is configured to perform the functionality of machine learning system 118, information handling system 100 becomes a specialized computing device specifically configured to perform the functionality of machine learning system 118, and is not a general purpose computing device. Moreover, the implementation of functionality of machine learning system 118 on information handling system 100 improves the functionality of information handling system 100 and provides a useful and concrete result of improving data analysis, scoring of actions, and selection or ranking of actions using novel techniques as disclosed herein.

Figure 2:
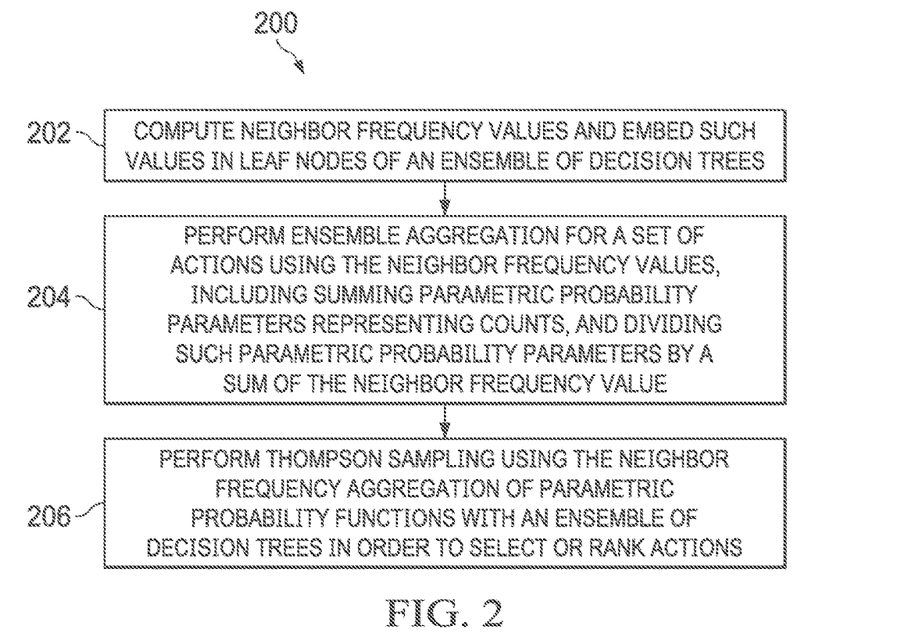
FIG. 2 illustrates a flow chart of an example method for neighbor frequency aggregation of parametric probability distributions with decision trees, in accordance with embodiments of the present disclosure.

FIG. 2 illustrates a flow chart of an example method 200 for neighbor frequency aggregation of parametric probability distributions with decision trees, in accordance with embodiments of the present disclosure. According to some embodiments, method 200 may begin at step 202. As noted above, teachings of the present disclosure may be implemented in a variety of configurations of information handling system 100. As such, the preferred initialization point for method 200 and the order of the steps comprising method 200 may depend on the implementation chosen.

At step 202, machine learning system 118 may compute neighbor frequency values and embed such values in leaf nodes of an ensemble of decision trees. Such neighbor frequency value may be an estimate of how often pairs of samples in a leaf node of a given decision tree occupies the same leaf node across other decision trees in an ensemble of decision trees.

Figure 3:
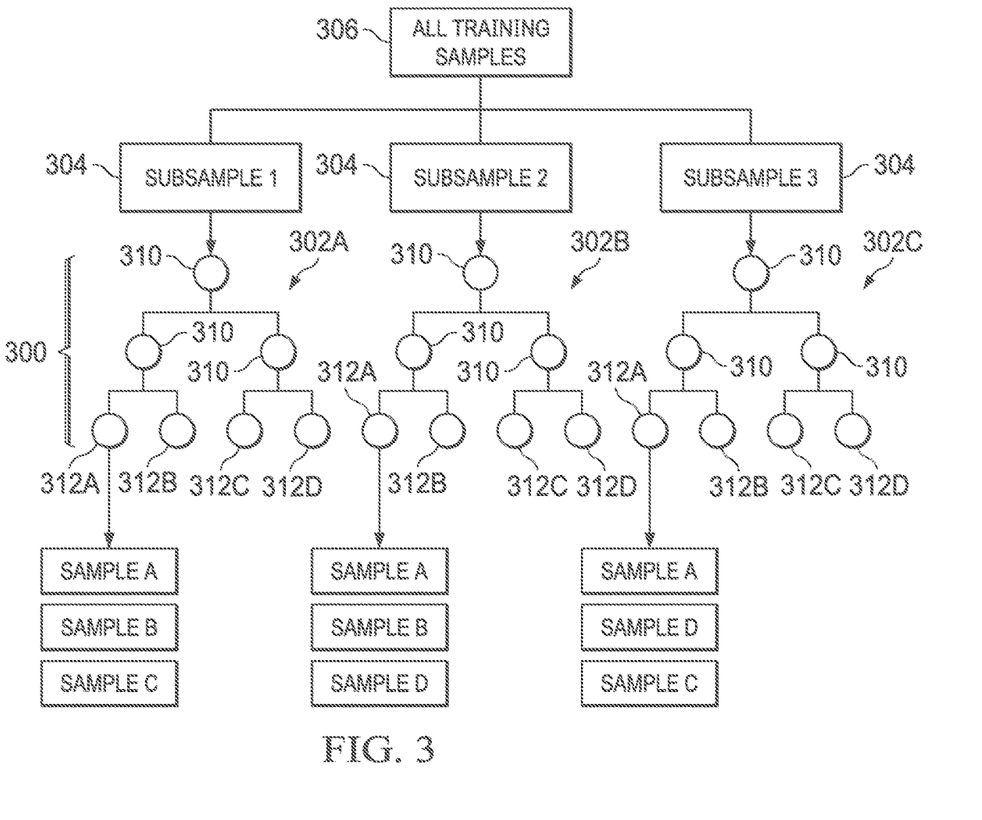
FIG. 3 illustrates an ensemble of decision trees created from a plurality of subsamples, in accordance with embodiments of the present disclosure.

To further illustrate, reference is made to FIG. 3, which illustrates an ensemble 300 of decision trees 302 (e.g., decision trees 302A, 302B, and 302C) created from a plurality of subsamples 304, in accordance with embodiments of the present disclosure. As shown in FIG. 3, machine learning system 118 may segregate a collection of training samples 306 into a plurality of subsamples 304. Machine learning system 118 may create such subsamples 304 the collection of training samples 306 in any suitable manner, including bootstrap subsampling or any other suitable approach. Machine learning system 118 may further generate each of the plurality of decision trees 302 from a respective subsample 304. As shown in FIG. 3, each decision tree 302 may have a plurality of nodes 310 with leaf nodes 312 (e.g., leaf nodes 312A, 312B, 312C, and 312D at each) the end of each branch of such decision tree 302. Each leaf node 312 may store one or more parameters. For example, FIG. 3 shows example samples used to construct the same leaf node 312A of each decision tree 302: leaf node 312A of decision tree 302A having stored therein Samples A, B, C; leaf node 312A of decision tree 302B having stored therein Samples A, B, D; and leaf node 312A of decision tree 302C having stored therein Samples A, D, C.

As noted above, a neighbor frequency value may be an estimate of how often pairs of samples in a leaf node of a given decision tree occupies the same leaf node across other decision trees in an ensemble of decision trees. Thus, when comparing leaf node 312A of decision tree 302A to corresponding leaf nodes 312A of each of decision trees 302B and 302C, it is seen that Samples B and C share the same leaf node 312 as Sample A 50 percent of the time, thus resulting in a neighbor frequency value of 0.5 for leaf node 312A of decision tree 302A.

To further explain, machine learning system 118 may determine neighbor frequency values that represent how frequently neighboring samples within a leaf node 312 of each decision tree 302 share the same leaf node 312 across other decision trees of the ensemble 300. In essence, machine learning system 118 may enable each sample to "ask" its neighbors the question, "how often are you my neighbor?" Thus, the neighbor frequency values may be influenced by at least three factors:

a) Subsampling: When a smaller percentage of samples are selected to generate individual decision trees, the frequency of the same neighbor appearing in other decision trees 302 may decrease;

b) Resolution: When tree resolution increases by increasing tree depth, the neighbor frequency may decrease;

c) Diversity: Increased diversity in tree construction may decrease the neighbor frequency. Subsampling of features allowed for splitting criteria is a common technique used to constrain tree construction, in order to introduce diversity.

In tree regions where diversity between decision trees 302 is high, the neighbor frequency value may be low. In areas regions where diversity between decision trees 302 is low, the neighbor frequency value may be high. Although an exact neighbor frequency value may be prohibitively slow to compute, machine learning system 118 may efficiently compute an unbiased estimate using random sampling. Such estimate may measure the combined effect of subsampling, resolution, and diversity.

To even further illustrate, during construction of decision trees 302, for each decision tree 302, machine learning system 118 may determine which samples filter to each leaf node 312, and machine learning system 118 may store leaf node references with each sample. Machine learning system 118 may also store up to a maximum of kNodeSampleCount randomly selected samples with each leaf node 312. The value kNodeSampleCount has a memory cost, but may not affect algorithmic performance. For example, machine learning system 118 may use a value of kNodeSampleCount equal to 100, which may provide good accuracy at a moderate storage cost. During neighbor frequency value computation, machine learning system 118 may examine pairs of samples for kNeighborSample iterations. Machine learning system 118 may later sum the resulting neighbor frequency value across hundreds of decision trees 302, so the effective number of samples may be hundreds of times higher. Such approach may allow for sufficient accuracy from a small number of samples, provided that the samples are unbiased. Sufficient accuracy from a small number of samples may be important for computational efficiency, due to algorithmic performance of order O(kNeighborSampleCount*TreeNodeCount*kTreeCount), where kTreeCount is a number of trees. The choice for value kNeighborSampleCount may be arbitrary, but higher numbers may produce better accuracy, up to a point of diminishing returns. For example, the point of diminishing returns may vary by data set, but in particular embodiments, machine learning system 118 may use a kNeighborSampleCount value of 1000, which may generally provide good results.

In this example described herein, machine learning system 118 may use bootstrap sampling to generate each decision tree 302. However, the systems and methods described herein may use any subsampling method, or may operate without any subsampling.

To create each decision tree 302 in the ensemble of kTreeCount decision trees 302, machine learning system 118 may generate bootstrap samples by randomly selecting samples (e.g., with replacement) from set of all samples 306. Performance may be maximized when the number of bootstrap samples is equal to the count of all samples, but a smaller number of samples may be used to minimize the computational cost of building decision trees 302 when used with large data sets. Example pseudocode to generate bootstrap samples may be as follows:

```
BootstrapSamples = empty
for iTreeBootstrapSample = 0...AllSamples.Count
    BootstrapSamples.Add(AllSamples[Randomvalue(0 to
AllSamples.Count-1)])
```

Once the set of bootstrap samples is generated, machine learning system 118 may generate a decision tree 302 using the bootstrap samples. At each leaf node 312, machine learning system 118 may store a reference to such leaf node 312 in all bootstrap samples filtered to such leaf node 312. In addition, machine learning system 118 may store up to kNodeSampleCount randomly selected samples in such lead node 312. Example pseudocode to generate decision trees 302 from bootstrap samples may be as follows:

```
for each Sample in FilteredSamples
    Sample.Leaves[treeindex] = LeafNode
for iSample = 0...Min(FilteredSamples.Count, kSampleCount)
    LeafNode.Samples.Add(FilteredSamples[Randomvalue(0 to
FilteredSamples.Count-1)])
```

Following construction of all decision trees 302, machine learning system 118 may examine pairs of samples in each leaf node 312 and determine how often such pairs were filtered into the same corresponding leaf node 312 of decision trees 302. As used herein, a pair of samples that are filtered into the same corresponding leaf node 312 are designated as "neighbors." For example, if two samples are neighbors 50% of the time, they have a neighbor frequency of 0.5. The neighbor frequency of a leaf node 312 may be calculated as the average of the neighbor frequency of its constituent samples. Different sections of the decision trees 302 may have different neighbor frequencies, and they may be able to adapt to a broad variety of factors that influence construction of decision trees 302.

For each leaf node 312 of each decision tree 302 in ensemble 300 of kTreeCount decision trees 302, when the number of samples in a leaf node 312 is less than 2 or kTreeCount is less than 2, machine learning system 118 may use a value of 1 for the neighbor frequency of that leaf node 312. At least two samples and two decision trees 302 may be required for neighbor frequency calculation, but a neighbor frequency value of 1 may work well for these degenerate cases.

Further, for each leaf node 312 of each decision tree 302 in ensemble 300 of kTreeCount decision trees 302, when the number of samples in a leaf node 312 is greater than 1, machine learning system 118 may calculate the neighbor frequency. For kNodeSampleCount samples stored in each leaf node 312, machine learning system 118 may compute the fraction of times that the samples were filtered to the same leaf nodes across all decision trees 302. Machine learning system 118 may not allow neighbor frequency to be less than 1/kTreeCount. Example pseudocode to generate neighbor frequency values may be as follows:

```
Neighbors = 0
Total = 0
for iNeighborSample = 0...kNeighborSampleCount
{
    // Select two random samples from current leaf.
    Sample1 = LeafSamples[RandomValue(0 to LeafSamples.Count-1)]
    Sample2 = LeafSamples[RandomValue(0 to LeafSamples.Count-1)]
    // Comparing sample to itself would bias results
    if (Sample1 not equal Sample2)
    {
        OtherTreeIndex = RandomValue(0 to kTreeCount-1)
        OtherTreeLeaf1 = Sample1.Leaves[OtherTreeIndex]
        OtherTreeLeaf2 = Sample2.Leaves[OtherTreeIndex]
        SampleWeight = Sample1.weight * Sample2.weight
        if (OtherTreeIndex = CurrentTreeIndex)
        {
            // To avoid introducing bias, samples from the current
            // tree must be included, but it needs to be included at
            // the same rate that other trees are included.
            // Select a random third tree to properly calibrate this
            // rate. Exclude the current tree from the random
            // selection.
            ThirdTreeIndex = RandomValue(0 to kTreeCount-1)
            if (ThirdTreeIndex >= CurrentTreeIndex)
                ThirdTreeIndex = ThirdTreeIndex + 1
            ThirdTreeLeaf1 = Sample1.Leaves[ThirdTreeIndex]
            ThirdTreeLeaf2 = Sample2.Leaves[ThirdTreeIndex]
            if ((ThirdTreeLeaf1 = None) and (ThirdTreeLeaf2 = None))
                SampleWeight = 0
            else if ((ThirdTreeLeaf1 = None) or (ThirdTreeLeaf2 = None))
                SampleWeight = 0.5 * SampleWeight
        }
        // Is the other sample also a neighbor in the other tree?
        // Only ask the question if this sample is present.
        // Consider the perspectives of both samples.
        // From the perspective of Sample 1
        if (OtherTreeLeaf1 not equal None)
```

```
        {
            if (OtherTreeLeaf1 = OtherTreeLeaf2)
                Neighbors = Neighbors + SampleWeight
            Total = Total + SampleWeight
        }
        // From the perspective of Sample 2
        if (OtherTreeLeaf2 not equal None)
        {
            if (OtherTreeLeaf1 = OtherTreeLeaf2)
                Neighbors = Neighbors + SampleWeight
            Total = Total + SampleWeight
        }
    }
}
// Minimum frequency is 1/kTreeCount.
// Maximum frequency is 1, but don't clamp at 1 to avoid
// introducing bias.
LeafNode.NeighborFrequency = Max(NeighborCount/Max(1, TotalCount),
                1/kTreeCount)
```

Turning back to FIG. 2, at step 204, machine learning system 118 may perform ensemble aggregation for a set of actions using the neighbor frequency values computed at step 202. Such ensemble aggregation may comprise summing parametric probability parameters representing counts, dividing such parametric probability parameters by a sum of the neighbor frequency value. Such approach can be applied to any parametric probability density function used with an ensemble of decision trees, provided that such parametric probability density function has parameters representing counts. Parameters not representing counts may be aggregated by using averaging.

Figure 4:
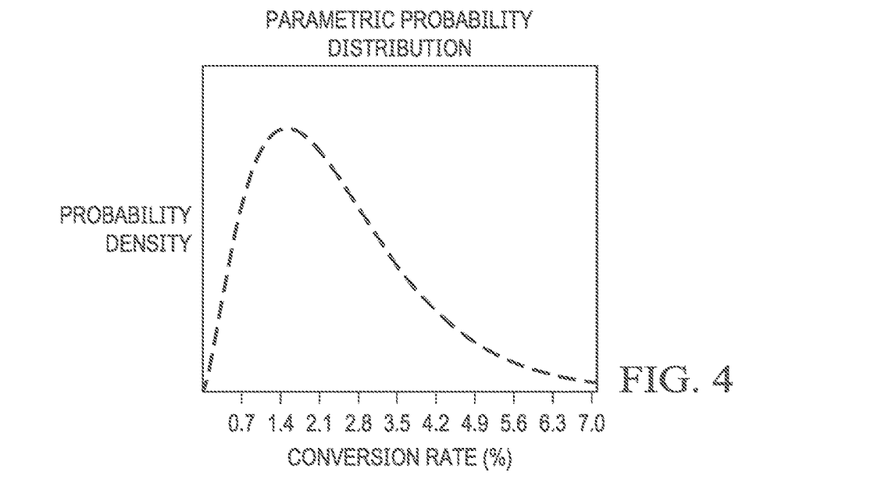
FIG. 4 illustrates an example plot of a parametric probability distribution generated using neighbor frequency aggregation, in accordance with embodiments of the present disclosure.

To further illustrate, machine learning system 118 may use a novel aggregation approach to compute parametric probability distribution parameters representing counts, dividing such parametric probability distribution parameters by the sum of the neighbor frequency parameter computed above. Such approach may be applied to any parametric probability distribution function used with ensembles of decision trees, provided that the function has parameters representing counts. Parameters not representing counts may be aggregated using traditional averaging. FIG. 4 illustrates an example plot of a parametric probability distribution generated using neighbor frequency aggregation, in accordance with embodiments of the present disclosure.

Voting is a traditional aggregation method when using ensembles of decision trees for classification, but the approach of this disclosure does not employ voting. It may also be common to use averaging as the aggregation method when using ensembles of decision trees for regression. However, the averaging aggregation method may overestimate uncertainty when applied to parametric probability distribution parameters involving counts. This inaccuracy in the probability distribution may substantially degrade the performance of Thompson sampling.

To even further illustrate, the neighborhood frequency aggregation approach described herein is demonstrated with two example parametric probability density functions: the beta-binomial distribution function for binomial values and the normal distribution function for continuous values. It is also possible to use other parametric probability density functions that incorporate counts and realize similar benefits with the neighbor frequency aggregation approach disclosed herein, but discussion is limited to these two examples for the sake of clarity and exposition.

In all cases the procedure may essentially be the same, with minor details to adapt the parametric probability distribution to use the neighbor frequency value. The beta-binomial distribution function may commonly be used to sample the probability distribution for binomial values (also known as Bernoulli trials). To perform neighbor frequency aggregation using beta-binomial distribution function, for each tree in ensemble 300 of kTreeCount decision trees 302, machine learning system 118 may filter the sample context to the appropriate leaf node 312, and sum the following parameters: SampleCount, SuccessCount, and the Neighbor-Frequency parameter defined above. Example pseudocode to perform neighbor frequency aggregation using the beta-binomial distribution function may be as follows:

```
SumSampleCount = SumSuccessCount =
SumNeighborFrequency = 0
For each Tree in TreeEnsemble
    Node = FindNode(Tree, Context)
    SumSampleCount = SumSampleCount +
        Node.SampleCount
    SumSuccessCount = SumSuccessCount +
        Node.SuccessCount
    SumNeighborFrequency = SumNeighborFrequency +
        Node.NeighborFrequency
```

In this case, both SampleCount and SuccessCount represent counts, and machine learning system 118 may divide these parameters by the sum of the NeighborFrequency parameter (e.g., for neighbor frequency aggregation.) A function SampleBetaBinomialDistribution( ) may generate a probability density sample from the beta-binomial distribution. Example pseudocode to generate a probability density sample from the beta-binomial distribution function may be as follows:

```
SamplesDivSumNF = SumSampleCount/Max(1,
SumNeighborFrequency)
SuccessesDivSumNF = SumSuccessCount/Max(1,
SumNeighborFrequency)
SampleAlpha = SuccessesDivSumNF + 1
SampleBeta = Max(0, SamplesDivSumNF – SuccessesDivSumNF) + 1
PDFSample = SampleBetaBinomialDistribution(SampleAlpha,
SampleBeta)
```

Figure 5:
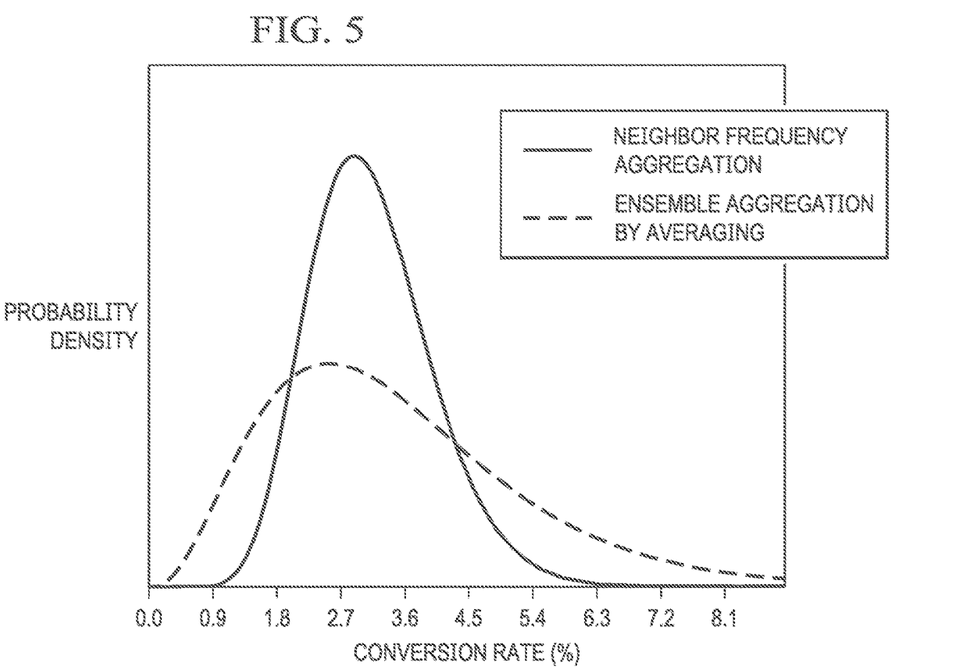
FIG. 5 illustrates example plots contrasting probability density samples generated by the beta-binomial distribution function using neighbor frequency aggregation and a probability density samples generated by the beta-binomial distribution function using ensemble aggregation by averaging, in accordance with embodiments of the present disclosure.

FIG. 5 illustrates example plots contrasting probability density samples generated by the beta-binomial distribution function using neighbor frequency aggregation (shown in the solid plot) and probability density samples generated by the beta-binomial distribution function using ensemble aggregation by averaging (shown in the dashed plot), in accordance with embodiments of the present disclosure. As shown in FIG. 5, using ensemble aggregation by averaging may lead to excessive uncertainty while using neighbor frequency aggregation may lead to accurate uncertainly.

The normal distribution (which may also be known as the standard distribution function) is commonly used to sample the probability distribution for continuous values. Machine learning system 118 may, for each tree in ensemble 300 of kTreeCount decision trees 302, filter the sample context to the appropriate leaf node 312, and sum the parameters SampleCount, ValueMean, ValueStdDev, and the Neighbor-Frequency parameter defined above. Machine learning system may weight parameters ValueMean and ValueStdDev by parameter SampleCount in this example to compute a weighted average, because such parameters describe a property of the samples. Example pseudocode to perform neighbor frequency aggregation using the normal distribution function may be as follows:

```
SumSampleCount = SumValueMean = SumValueStdDev =
SumNeighborFrequency =
    0
For each Tree in TreeEnsemble
    Node = FindNode(Tree, Context)
    SumSampleCount = SumSampleCount + Node.SampleCount
    SumValueMean = SumValueMean +
    Node.SampleCount*Node.ValueMean
    SumValueStdDev = SumValueStdDev +
    Node.SampleCount*Node.ValueStdDev
    SumNeighborFrequency = SumNeighborFrequency +
    Node.NeighborFrequency
```

In this case, the parameter SampleCount represents counts, and machine learning system 118 may divide such parameter SampleCount by the sum of parameter Neighbor-Frequency (e.g., for Neighbor Frequency Aggregation.) Parameters ValueTotal and ValueStdDev do not represent counts and thus may use traditional averaging. For a simple average, machine learning system 118 may divide parameters ValueTotal and ValueStdDev by parameter kTree-Count, but because such parameters are weighted by parameter SampleCount in this example, the weighted average may computed by dividing by SumSampleCount. A function SampleNormalDistribution( ) may generates a normally distributed random value centered on zero with a unit standard distribution. Example pseudocode to generate a probability density sample from the normal distribution function may be as follows:

Generate a probability density sample:

```
SamplesDivSumNF = SumSampleCount/Max(1, SumNeighborFrequency)
AvgValueMean = SumValueMean/Max(1, SumSampleCount)
AvgValueStdDev = SumValueStdDev/Max(1, SumSampleCount)
ProbDistStdDev = AvgValueStdDev/Max(1, Sqrt(SamplesDivSumNF))
PDFSample = AvgValueMean +
ProbDistStdDev*SampleNormalDistribution( )
```

Figure 6:
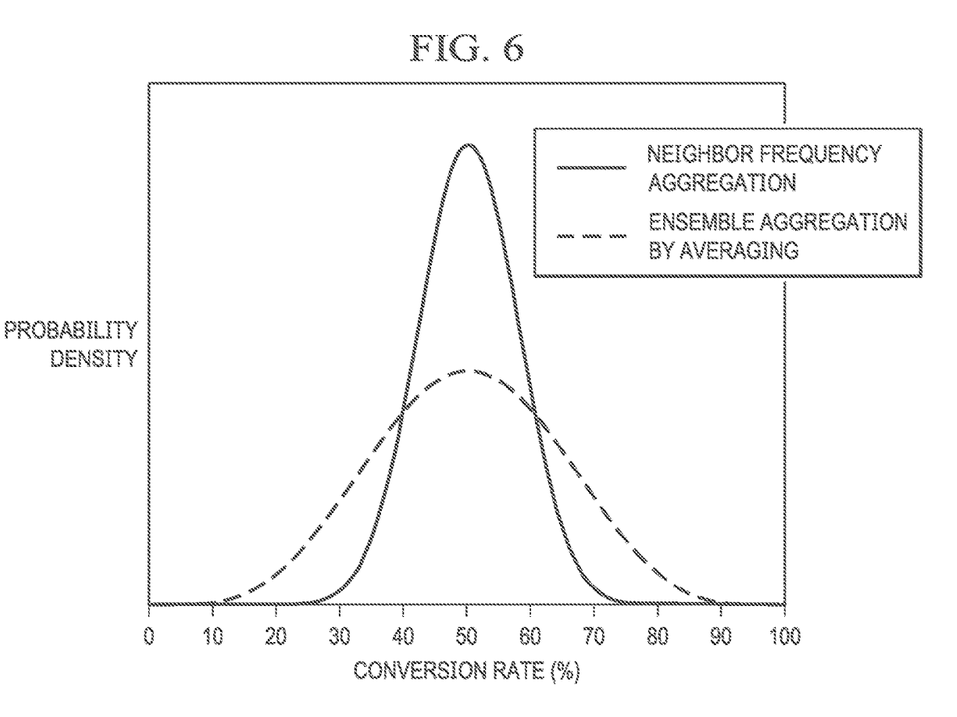
FIG. 6 illustrates example plots contrasting probability density samples generated by the normal distribution function using neighbor frequency aggregation and probability density samples generated by the normal distribution function using ensemble aggregation by averaging, in accordance with embodiments of the present disclosure.

FIG. 6 illustrates example plots contrasting probability density samples generated by the normal distribution function using neighbor frequency aggregation (shown in the solid plot) and probability density samples generated by the normal distribution function using ensemble aggregation by averaging (shown in the dashed plot), in accordance with embodiments of the present disclosure. As shown in FIG. 6, using ensemble aggregation by averaging may lead to excessive uncertainty while using neighbor frequency aggregation may lead to accurate uncertainly.

Figure 7:
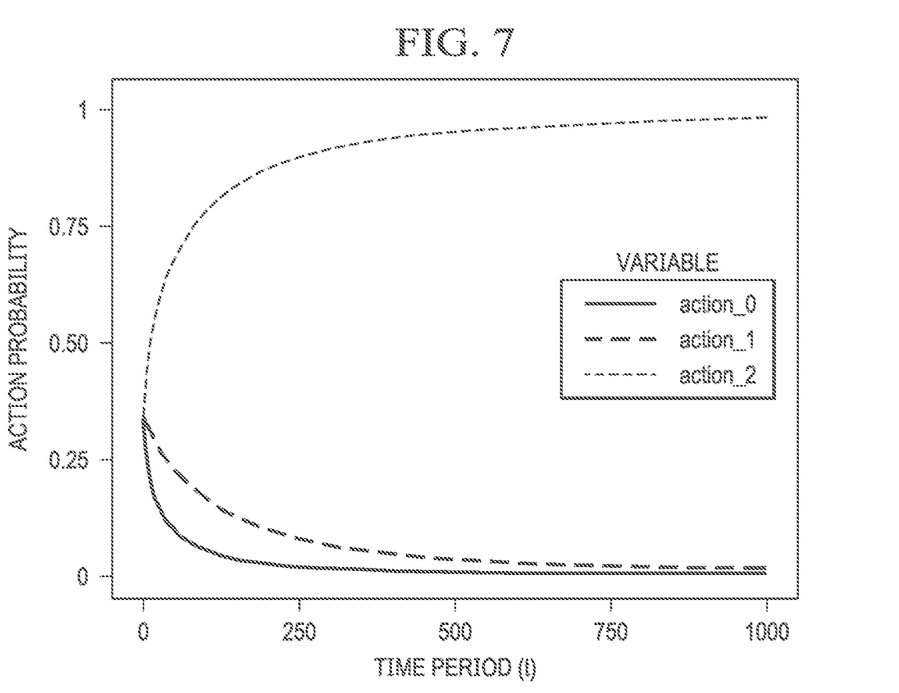
FIG. 7 illustrates example plots of ranking of actions based on Thompson sampling, in accordance with embodiments of the present disclosure.

Turning back to FIG. 2, at step 206, machine learning system 118 may perform Thompson sampling using the neighbor frequency aggregation of parametric probability functions with an ensemble of decision trees determined at step 204. For example, machine learning system 118 may use Thompson sampling and posterior probability samples to select or rank actions using Thompson sampling, as shown in FIG. 7.

To further illustrate, in some embodiments, machine learning system 118 may perform Thompson sampling to select a best action for each new sample, with a given context. Example pseudocode to use Thompson sampling to select a best action for each new sample may be as follows:

```
For each Action in Actions
    ActionSampleValue = ProbabilityDensitySample(Action.Trees,
    Context)
    If ActionSampleValue > BestSampleValue
        BestSampleValue = ActionSampleValue
        BestAction = Action
```

Alternatively, in some embodiments, machine learning system 118 may create a ranked group of actions by sorting the actions by their sampled values. Example pseudocode to use Thompson create a ranked group of actions by sorting the actions by their sampled values may be as follows:

```
For each Action in Actions
    ActionSampleValue = ProbabilityDensitySample(Action.Trees,
    Context)
    AllActionSamples.Add(Action, ActionSampleValue)
SortByValue(AllActionSamples)
```

After completion of step 206, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using CPU 102, machine learning system 118 executing thereon, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implementable method comprising:
    examining pairs of samples in each leaf node of a plurality of decision trees and for each pair of samples, determining a neighbor frequency of each pair of samples as a frequency of how often such pair of samples are filtered into a particular leaf node of the plurality of decision trees; and
    for each leaf node of the plurality of decision trees, determining a neighbor frequency of the leaf node as an average of the neighbor frequencies of the samples of the leaf node.

2. The computer-implementable method of claim 1, further comprising creating the plurality of decision trees from a collection of samples using subsampling.

3. The computer-implementable method of claim 2, further comprising creating the plurality of decision trees from the collection of samples using bootstrap sampling.

4. The computer-implementable method of claim 1, further comprising aggregating parametric probability density parameters based on the neighbor frequencies of the leaf nodes.

5. The computer-implementable method of claim 4, wherein at least one parameter of the parametric probability density parameters represents a count, and aggregating comprises dividing at least one sum of leaf node parameters by a sum of leaf node neighbor frequencies.

6. The computer-implementable method of claim 4, wherein the parametric probability density parameters are created from a beta-binomial distribution function.

7. The computer-implementable method of claim 4, wherein the parametric probability density parameters are created from a normal distribution function.

8. The computer-implementable method of claim 4, further comprising selecting an action from a plurality of actions or ranking the plurality of actions based on the aggregating of the parametric probability density parameters based on the neighbor frequencies of the leaf nodes.

9. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        examining pairs of samples in each leaf node of a plurality of decision trees and for each pair of samples, determining a neighbor frequency of each pair of samples as a frequency of how often such pair of samples are filtered into a particular leaf node of the plurality of decision trees; and
        for each leaf node of the plurality of decision trees, determining a neighbor frequency of the leaf node as an average of the neighbor frequencies of the samples of the leaf node.

10. The system of claim 9, the instructions further configured for creating the plurality of decision trees from a collection of samples using subsampling.

11. The system of claim 10, the instructions further configured for creating the plurality of decision trees from the collection of samples using bootstrap sampling.

12. The system of claim 9, the instructions further configured for aggregating parametric probability density parameters based on the neighbor frequencies of the leaf nodes.

13. The system of claim 12, wherein at least one parameter of the parametric probability density parameters represents a count, and aggregating comprises dividing at least one sum of leaf node parameters by a sum of leaf node neighbor frequencies.

14. The system of claim 12, wherein the parametric probability density parameters are created from a beta-binomial distribution function.

15. The system of claim 12, wherein the parametric probability density parameters are created from a normal distribution function.

16. The system of claim 12, the instructions further configured for selecting an action from a plurality of actions or ranking the plurality of actions based on the aggregating of the parametric probability density parameters based on the neighbor frequencies of the leaf nodes.

17. A non-transitory, computer-readable storage medium embodying computer program code, the computer program code comprising computer executable instructions configured for:

examining pairs of samples in each leaf node of a plurality of decision trees and for each pair of samples, determining a neighbor frequency of each pair of samples as a frequency of how often such pair of samples are filtered into a particular leaf node of the plurality of decision trees; and     for each leaf node of the plurality of decision trees, determining a neighbor frequency of the leaf node as an average of the neighbor frequencies of the samples of the leaf node.

18. The non-transitory, computer-readable storage medium of claim 17, the computer executable instructions further configured for creating the plurality of decision trees from a collection of samples using subsampling.

19. The non-transitory, computer-readable storage medium of claim 18, the computer executable instructions further configured for creating the plurality of decision trees from the collection of samples using bootstrap sampling.

20. The non-transitory, computer-readable storage medium of claim 17, the computer executable instructions further configured for aggregating parametric probability density parameters based on the neighbor frequencies of the leaf nodes.

21. The non-transitory, computer-readable storage medium of claim 20, wherein at least one parameter of the parametric probability density parameters represents a count, and aggregating comprises dividing at least one sum of leaf node parameters by a sum of leaf node neighbor frequencies.

22. The non-transitory, computer-readable storage medium of claim 20, wherein the parametric probability density parameters are created from a beta-binomial distribution function.

23. The non-transitory, computer-readable storage medium of claim 20, wherein the parametric probability density parameters are created from a normal distribution function.

24. The non-transitory, computer-readable storage medium of claim 20, the computer executable instructions further configured for selecting an action from a plurality of actions or ranking the plurality of actions based on the aggregating of the parametric probability density parameters based on the neighbor frequencies of the leaf nodes.

\* \* \* \* \*